(12) United States Patent
Carroni et al.

(10) Patent No.: US 9,523,311 B2
(45) Date of Patent: Dec. 20, 2016

(54) METHOD OF OPERATING A GAS TURBINE, AND GAS TURBINE WITH WATER INJECTION

(75) Inventors: Richard Carroni, Niederrohrdof (CH); Gianfranco Guidati, Zürich (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 586 days.

(21) Appl. No.: 12/613,564

(22) Filed: Nov. 6, 2009

(65) Prior Publication Data
US 2010/0146984 A1 Jun. 17, 2010

Related U.S. Application Data

(63) Continuation of application No. PCT/EP2008/054718, filed on Apr. 18, 2008.

(30) Foreign Application Priority Data

May 8, 2007 (EP) .................................. 07107730

(51) Int. Cl.
*F02C 3/30* (2006.01)
*F01K 21/04* (2006.01)
(Continued)

(52) U.S. Cl.
CPC .............. *F02C 3/30* (2013.01); *F01K 21/047* (2013.01); *F01K 23/067* (2013.01); *F23K 5/007* (2013.01);
(Continued)

(58) Field of Classification Search
CPC ........ F02C 3/30; F01K 21/047; F01K 23/067; F23L 7/002; F23R 3/28; F23K 5/007; F23K 2401/10; Y02E 20/18
(Continued)

(56) References Cited

U.S. PATENT DOCUMENTS 5,175,994 A * 1/1993 Fox et al. ................. 60/39.58
5,233,823 A   8/1993 Day
(Continued)

FOREIGN PATENT DOCUMENTS

DE   19900026   7/2000
EP   0731255    9/1996
(Continued)

OTHER PUBLICATIONS

Search Report for European Patent App. No. 07107730.9 (Oct. 2, 2008).
(Continued)

*Primary Examiner* — Audrey K Bradley
(74) *Attorney, Agent, or Firm* — Buchanan Ingersoll & Rooney PC (57) ABSTRACT

Reliable, low-NOx-emission operation of a gas turbine plant with hydrogen-rich fuel gas, and a gas turbine plant with a device for water injection into hydrogen-rich fuels in a gas turbine, involves suitable water injection (21), a water-fuel gas mist, i.e., a fuel gas in which fine water droplets are suspended, is created in the fuel gas feed line (15). This mist is introduced into the burners (20) of the gas turbine. As a result of the water-fuel gas mist, four effects are combined for ignition delay and reduction of the flame velocity of hydrogen-rich fuel gas. When using a water-fuel gas mist, the water, in a directed manner, reaches the region in the burner (20) in which it directly has the greatest possible effect upon the flame or the flame velocity.

12 Claims, 4 Drawing Sheets

(51) Int. Cl.
  *F01K 23/06* (2006.01)
  *F23K 5/00* (2006.01)
  *F23L 7/00* (2006.01)
  *F23R 3/28* (2006.01)

(52) U.S. Cl.
  CPC .................. *F23L 7/002* (2013.01); *F23R 3/28* (2013.01); *F23K 2401/10* (2013.01); *Y02E 20/18* (2013.01)

(58) Field of Classification Search
  USPC ........................................................ 60/39.59
  See application file for complete search history.

(56) References Cited

U.S. PATENT DOCUMENTS

| | | | | |
|---|---|---|---|---|
| 5,628,184 | A * | 5/1997 | Santos | F02C 3/22 60/39.281 |
| 6,027,331 | A * | 2/2000 | Dobbeling et al. | 431/182 |
| 6,148,602 | A | 11/2000 | Demetri | |
| 6,453,659 | B1 * | 9/2002 | Van Liere et al. | 60/39.53 |
| 6,470,667 | B1 * | 10/2002 | Payling et al. | 60/39.3 |
| 6,595,003 | B2 * | 7/2003 | Dalla Betta et al. | 60/777 |
| 6,986,245 | B2 * | 1/2006 | Moser | 60/39.281 |
| 7,152,409 | B2 * | 12/2006 | Yee | F23C 13/00 431/7 |
| 2003/0217553 | A1 | 11/2003 | Gadde et al. | |
| 2007/0266632 | A1 * | 11/2007 | Tsangaris | C10J 3/18 48/190 |

FOREIGN PATENT DOCUMENTS

| | | |
|---|---|---|
| EP | 0899438 | 3/1999 |
| EP | 0982543 | 3/2000 |
| EP | 1065347 | 1/2001 |
| EP | 1659277 | 5/2006 |
| WO | WO2005/124231 | 12/2005 |
| WO | WO2008/135362 | 11/2008 |

OTHER PUBLICATIONS

International Search Report for PCT Patent App. No. PCT/EP2008/054718 (Oct. 24, 2008).

* cited by examiner

METHOD OF OPERATING A GAS TURBINE, AND GAS TURBINE WITH WATER INJECTION

This application is a Continuation of, and claims priority under 35 U.S.C. §120 to, International patent application number PCT/EP2008/054718, filed 18 Apr. 2008, and claims priority therethrough under 35 U.S.C. §§119, 365 to European patent application number 07107730.9, filed 8 May 2007, the entireties of which are incorporated by reference herein.

BACKGROUND

Field of Endeavor

The invention refers to a method for the reliable, low-NOx-emission operation of a stationary gas turbine plant with hydrogen-rich fuel gas, and also to a gas turbine plant with a device for carrying out the method.

Brief Description of the Related Art

The research and development of the combustion of hydrogen or hydrogen-rich fuels in gas turbines is essentially driven forward by two factors.

On the one hand, there is a global interest in reducing the emission of greenhouse gases, especially of $CO_2$. One possibility for this is the changeover from conventional fossil fuels to a hydrogen-based energy supply. In this case, this can, first of all, still be based on conventional fossil raw materials with hydrogen synthesis and $CO_2$ bonding.

On the other hand, the limited natural gas reserves lead to considerations of using synthetically processed gaseous fuels alternatively to, or in combination with, the combustion of conventional types of fuel. These synthetically processed gaseous fuels, as are found for example in an IGCC (Integrated Gasification Combined Cycle), frequently contain high hydrogen concentrations.

The combustion of hydrogen in conventional combustion systems of gas turbines leads to technical problems, as is known, such as increased NOx emissions and flashback, on account of the high flame velocity and short ignition delay times of the hydrogen.

As a countermeasure, in addition to the simple reduction of the operating values, the possibility of diluting the hydrogen-rich fuel with $N_2$ or other inert gases, and especially different concepts for the dilution of the combustion air or of the fuel gas with steam, are known. In this case, steam is injected, or water is injected for evaporation in the air passage or in the fuel system.

So, for example, EP0731255 describes a gas turbine in which superheated steam and/or saturated steam, after superheating in a heat exchanger, is injected into the combustion chamber. As a further step, as a result of which the efficiency of the power plant is improved, EP0899438 outlines the use of water vapor for cooling different components before the steam is introduced into the combustion chamber.

According to EP1659277, water or water vapor is injected into the flow of the combustion air which is compressed by the compressor, before entry into the combustion chamber, in order to reduce the NOx emissions.

DE19900026 describes a way in which water or water vapor is advantageously already injected into the compressor and therefore the compression work and the compressor exit temperature is reduced.

EP1065347 describes a method for the saturation of fuel gas with water and superheating the resulting fuel gas-steam mixture before this is introduced into the combustion chamber of a gas turbine power plant.

SUMMARY

One of numerous aspect of the present invention includes the reliable, low-NOx combustion of hydrogen-rich fuel gases in the gas turbines. In particular, the safeguarding against flashback when combusting hydrogen-rich fuel gases in gas turbines is another of these aspects.

Another aspect includes water injection into the fuel gas upstream of the burners for creating a water-fuel gas mist, which is introduced into the burners. A fuel gas in which water has been atomized and in which, as a consequence, fine water droplets are suspended, is to be understood by "water-fuel gas mist". In this way, four effects can be combined for ignition delay and reduction of the flame velocity of hydrogen-rich fuel gas:

hydrogen-rich fuel gas is diluted by $H_2O$, as a result of the inert mass which is supplied with $H_2O$, the mixture is thermally more inert and, consequently, a temperature rise is reduced, $H_2O$ kinetically brakes the reaction, and the fuel gas mixture is locally intensely cooled via evaporation heat.

So that these effects become as effective as possible, water is not introduced into the combustion air, which has a relatively high volume portion and mass portion in the combustion chamber, but is introduced directly into the fuel gas. In order to create the above-described effect of local cooling by evaporation, the water is not admixed as steam or evaporated and superheated in the fuel gas, but injected in liquid form so that a water-fuel mist results. In this way, it is ensured that the water which is fed in the form of fine drops reaches the region in the burner in which it has the greatest effect upon a flame or the flame velocity.

Figure 1:
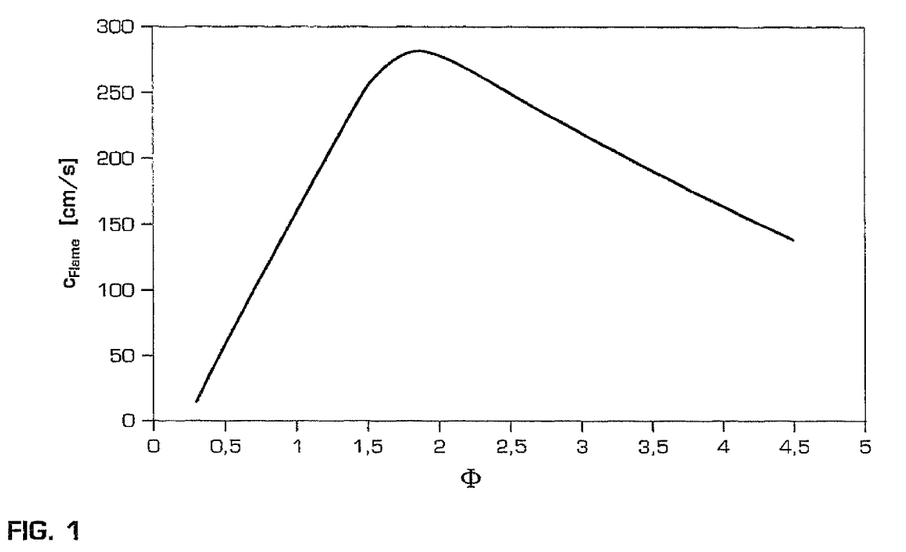
FIG. 1 shows the dependency of flame velocity of a hydrogen flame in air under atmospheric conditions upon the stoichiometric ratio $\Phi$.

The basic problem with hydrogen combustion can be explained with reference to FIG. 1, in which the flame velocity of hydrogen in air, under atmospheric conditions in dependence upon the stoichiometric ratio Φ, is shown. In contrast to natural gases (for example, fuel gas with over 80% methane portion), which reach their highest flame velocity during practically stoichiometric combustion (Φ=1, that is to say the entire air oxygen is consumed during the reaction with the fuel gas), and in the case of a rich mixture quickly show a distinct reduction of the flame velocity, the hydrogen flame reaches its maximum in the case of rich mixtures with Φ of barely 2. The combustible range and a high flame velocity stretch to very rich mixtures. This high flame velocity in the case of rich mixture, without suitable countermeasures in a gas turbine, leads to ignition and flashback of the air-fuel mixtures directly after injection of the hydrogen-rich fuel. Ignition takes place before a distinct reduction of the fuel content by mixing with compressor exit air can occur. The flame in this case flashes back into the burners in an uncontrolled manner and, as a result of the locally high fuel concentrations, very large temperature spikes, with correspondingly heavy NOx emission, occur. As a result of the flashback, the burner hardware can also be damaged within a shorter time.

As a result of the effects of a water-fuel gas mist, which are explained above, the reaction speed of the hydrogen-rich fuel gas is reduced to the extent that an extensive mixing of the fuel gas with the combustion air can be realized before the actual combustion occurs.

An important effect for delaying the flame is achieved if the water droplets in the fuel gas remain right into the combustion chamber. As a result of the evaporation heat of the entrained water mist, a fast temperature rise of the fuel gas is prevented there and therefore ignition before the desired mixing with combustion air is suppressed.

A further advantage of a water-fuel gas mist is the density of the mist which increases as the water portion increases. The penetration depth of the water-fuel gas mist into the combustion air is in proportion to the density of the mist. As a result of the increased penetration depth of the water-fuel gas mist, the fuel gas can be kept away from the peripheral zones and boundary layers of the burner, in which low flow velocities prevail. In this way, the risk of flashback can be further reduced and burner reliability correspondingly further increased.

Alternatively, with the same penetration depth, the injection speed can be reduced as density of the water-fuel gas mist increases. Lower injection speed means smaller pressure losses and consequently lower demands on the inflow pressure of the fuel gas and on the water injection. In addition to lower system costs, this results in a reduction of the compression capacity in cases in which the fuel gas has to be compressed for introduction into the gas turbine plant. This saving can be considerable especially in the case of hydrogen-rich fuel gases which require high volumetric flows.

In comparison to steam injection, the water injection inherently has the advantage of considerably smaller overall size. In particular, heat insulations on the feed pipes and long connecting pipes from the steam section of the power plant to the gas turbine section are also omitted. As a result, the costs of the fuel gas distribution system and of the feed pipes are significantly reduced. The arrangement around the spatially tightly restricted combustion chamber of a gas turbine becomes simpler and the accessibility for maintenance purposes of the gas turbine is not so seriously impeded as in the case of steam injection.

As a result of the combination of the effects which are explained herein, including utilization of the evaporation heat in order to reduce the flame velocity and of the local effectiveness which is proposed for this method, the water requirement is reduced in comparison to conventional methods. In addition to improved environmental friendliness, this means a smaller water treatment plant and smaller pumps for the water injection and consequently not only lower system costs, but also low energy costs. In comparison to the conventional methods with steam injection and/or gas dilution, with this optimized water injection the influence upon the gas turbine process is also minimized so that the expenditure for design adaptations or adaptations to operating parameters and operating concept is comparatively low.

The cooling effect, which the fuel gas experiences as a result of the water injection before reaching the combustion chamber, is desired and is advantageous since, with the reduced temperature, the flame velocity is further reduced.

In one embodiment, the entire injected water evaporates in the fuel gas distribution system and burner before reaching the combustion chamber. Depending upon the operating parameters, flashback can be prevented in this case as a result of the evaporation cooling and resulting vapor dilution of the hydrogen-rich fuel gas before entry into the combustion chamber. Relevant operating parameters in this case are the combustion chamber inlet temperature, the combustion chamber pressure, and also the hydrogen portion of the fuel gas. The complete evaporation of the mist is dependent upon the water portion in the water-fuel gas mist, the droplet size, pressure, temperature and also residence time of the mist in the fuel gas distribution system before reaching the combustion chamber.

Water injection into the fuel gas is not limited to pure water injection for creating a water-fuel gas mist. Combinations with the known measures for flashback prevention and NOx emission reduction are possible and can be advantageous corresponding to the specific circumstances. This for example is the case if, in the case of a syngas plant, $N_2$ is available as a waste product at an adequate pressure level and some of the amount of water which is to be injected can be saved by gas dilution.

Figure 4:
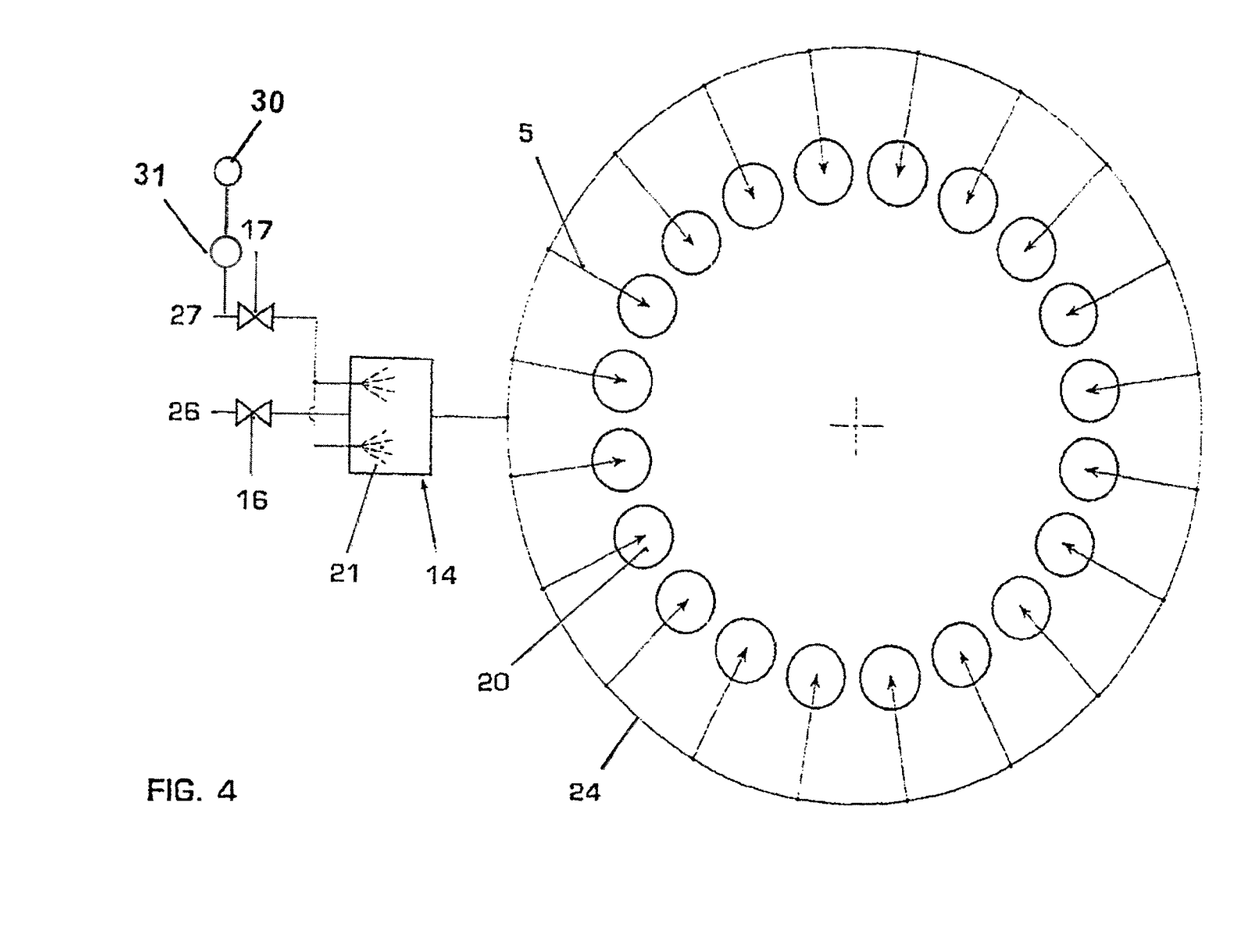
FIG. 4 shows details for a device for carrying out the method for water injection with one plenum for the injection of water into fuel gas and distribution of the water-fuel gas mist based on the example of a first combustion chamber.

In one embodiment of the method, as shown in FIG. 4, the water 27 which is to be injected is doped with flame-retarding substances 30 for preventing flashbacks with a flame-retarding doping device 31 upstream of the at least one device for injection of water 27.

In one embodiment of the method, the droplet size of the injected water is selected so that most of the water reaches the combustion chamber still as droplets suspended in the fuel gas and does not previously evaporate in the fuel gas distribution system. Under the constraint that most of the water reaches the combustion chamber, the droplet size, however, is to be kept as small as possible in order to ensure a quick evaporation in the combustion chamber, and consequently the desired, intense local cooling.

The optimum water droplet size is dependent upon the relevant parameters for evaporation of the water droplets and for transporting of the water-fuel gas mist in the fuel gas distribution system, and upon the relevant parameters for combustion. With regard to the transporting and evaporation, the optimum droplet size is in proportion to temperature and pressure of the fuel gas and also to the residence time between injection into the fuel gas and reaching the burner. Furthermore, the water portion is to be taken into consideration. In this case, the residence time is dependent upon the arrangement of the injection and the flow velocity in the fuel gas supply pipes. With regard to the combustion, the droplet size is dependent upon the compressor exit temperature, the combustion chamber pressure, the hot gas temperature, and other parameters which influence the combustion.

In addition to the method, another aspect includes gas turbine plant, characterized by at least one device for the injection of water into the fuel gas upstream of the burner.

One embodiment includes a gas turbine plant with devices for the injection of water into the fuel gas, into local individual plena which are connected upstream to the individual burners and, for example, are arranged annularly around an annular combustion chamber. As a result, the pipe length between the individual plena and the burners is minimized and a pipe routing which is as straight as possible becomes realizable, avoiding deflections or bends on which drops can be deposited. This allows the selection of relatively small droplets and lessens the risk of drop deposition and drop accumulation in the fuel gas distribution system and consequently of the formation of large secondary drops. Large secondary drops lead only to a limited extent to the desired local cooling in the fuel-air mixture and guarantee the risk of thermal shocks if they reach hot parts.

A further embodiment includes a gas turbine plant with devices for the injection of water into a single plenum for creating a water-fuel gas mist upstream of the fuel gas distribution system which, for example, is arranged annularly around the combustion chamber and which supplies the individual burners with water-fuel gas mist. The advantage of this arrangement is the injection at only one point and the saving of costly feed pipes to the individual plena. The complexity and costs of the system can be significantly reduced as a result. The possibility of secondary drop formation or complete evaporation of the water during the relatively long residence time in the fuel gas distribution system is to be taken into consideration in the case of this embodiment. For avoiding secondary drops, the drop size must be selected small enough. This again accelerates the evaporation so that the water content has to be increased and as a rule the fuel gas is oversaturated in order to ensure a uniform injection of water-fuel gas mist into all the burners.

One embodiment is a gas turbine plant with devices for the injection of water into the fuel gas, into local plena which, for example, are arranged annularly around an annular combustion chamber and from which two or more burners each are supplied with a water-fuel gas mist. Therefore, compared with an arrangement with an individual plenum per burner, the cost for feed pipes, water injection, etc., is reduced and the pipe lengths between the plena and the burners are kept short and a straight pipe routing remains realizable, avoiding deflections or bends on which drops can be deposited. This allows the selection of relatively small droplets and lessens the risk of drop precipitation and drop accumulation in the fuel gas distribution system and, consequently, of the formation of large secondary drops.

For the atomization of water, various methods are known, which are also applicable for atomization in fuel gas. Conventional pressure atomization, just like flash-atomization which became known from WO 99/67519, in which superheated, pressurized liquid by spontaneous boiling brings about atomization at the nozzle outlet, or pressure-swirl atomization in which a swirl is furthermore imparted to liquid at the outlet from an atomizing nozzle, are expedient types of injection. The combination of flash-atomization and pressure-swirl atomization, which in WO 99/67519 has become known under the name of swirl-flash atomization, is also known and applicable.

Furthermore, auxiliary media-assisted atomizing nozzles can be advantageously used since they allow a wide control range of the mass flow and of the drop size. If the fuel gas is available with adequate pressure level, provision can be made for the use of a partial fuel flow as medium for auxiliary media-assisted atomizing nozzles. Otherwise a gas such as $N_2$ or steam, which has the aforementioned dilution characteristics for hydrogen, is advantageous as auxiliary medium.

For controlling the amount of water which is to be injected, various parameters are to be taken into consideration.

In one embodiment of the method, the amount of water is selected in proportion to the burner inlet temperature of the combustion air. This can be the compressor exit temperature or, in the case of sequential combustion, the exit temperature from an upstream high-pressure turbine. The required amount of water is furthermore determined in proportion to the combustion chamber pressure and to the temperature of the fuel gas.

Furthermore, in one embodiment the amount of water is controlled in dependence upon the fuel gas composition, wherein it is essentially in proportion to the $H_2$ content. In the case of varying fuel gas compositions, a sufficiently quick online analysis of the fuel gas, which detects changes of the composition, can be provided before the gas reaches the combustion chamber. Depending upon the fuel gas composition, the amount of water is correspondingly controlled.

The amount of water is controlled in one embodiment in dependence upon the temperature of critical components which are exposed to the risk of flashback, such as burner shells or fuel gas lances, wherein the injected amount of water is increased or reduced in proportion to the temperature in order to achieve the target temperature.

In one embodiment, the injected amount of water is controlled in dependence upon, but inversely proportional to, the water content of the combustion chamber inlet air. This is a function of the ambient air and also of the water portion which is fed enroute into the combustion chamber, for example via fogging for cooling the induction air or wet compression (also known as High Fogging). For the case of sequential combustion, as for example originates from EP0620362, in the case of the inlet air of the second combustion chamber, the water portion which is fed directly in the first combustion chamber and fed via chemical reaction, is to be taken into consideration. The water portion can also be determined via measuring the water portion of the exhaust gases and by taking into consideration the water portion which is fed via chemical reaction.

Controlling the amount of water and drop size can be realized in various combinations of the dependencies which are specified above, in combination with other operating parameters of the power plant, which are not referred to here, and also in dependence upon only one parameter with its simple and unique set-up.

For operation of the power plant, exemplary methods can also have distinct advantages. Load changes of the gas turbine plant can be executed quickly and independently without influence upon the steam section of the power plant. In the case of low partial load, no minimum quantities, as are conventionally necessary for keeping the steam pipes warm, are to be accepted. In particular, start-up is significantly simplified since no preheating of the steam system is required. Separately fired additional boilers for preparation of the steam during starting are dispensed with.

DETAILED DESCRIPTION OF EXEMPLARY EMBODIMENTS

A gas turbine with a device for carrying out a method embodying principles of the present invention essentially has at least one compressor, at least one combustion chamber, and at least one turbine which, via at least one shaft, drives the compressor and a generator.

Figure 2:
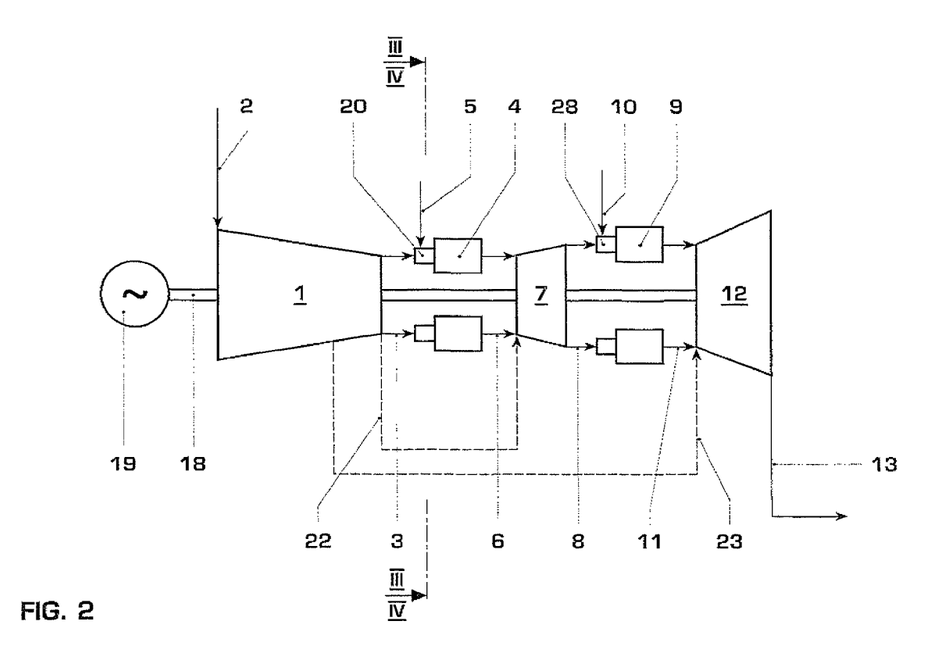
FIG. 2 shows a device for carrying out the method in the example of a gas turbine plant with sequential combustion.

FIG. 2 for example shows a gas turbine plant with sequential combustion, which, in an as known per se manner, also includes a compressor 1, a first combustion chamber 4, a first turbine 7, a second combustion chamber 9, a second turbine 12, and also a generator. The turbines 7 and 12, via a shaft 18, drive the compressor 1 and the generator 19.

Figure 3:
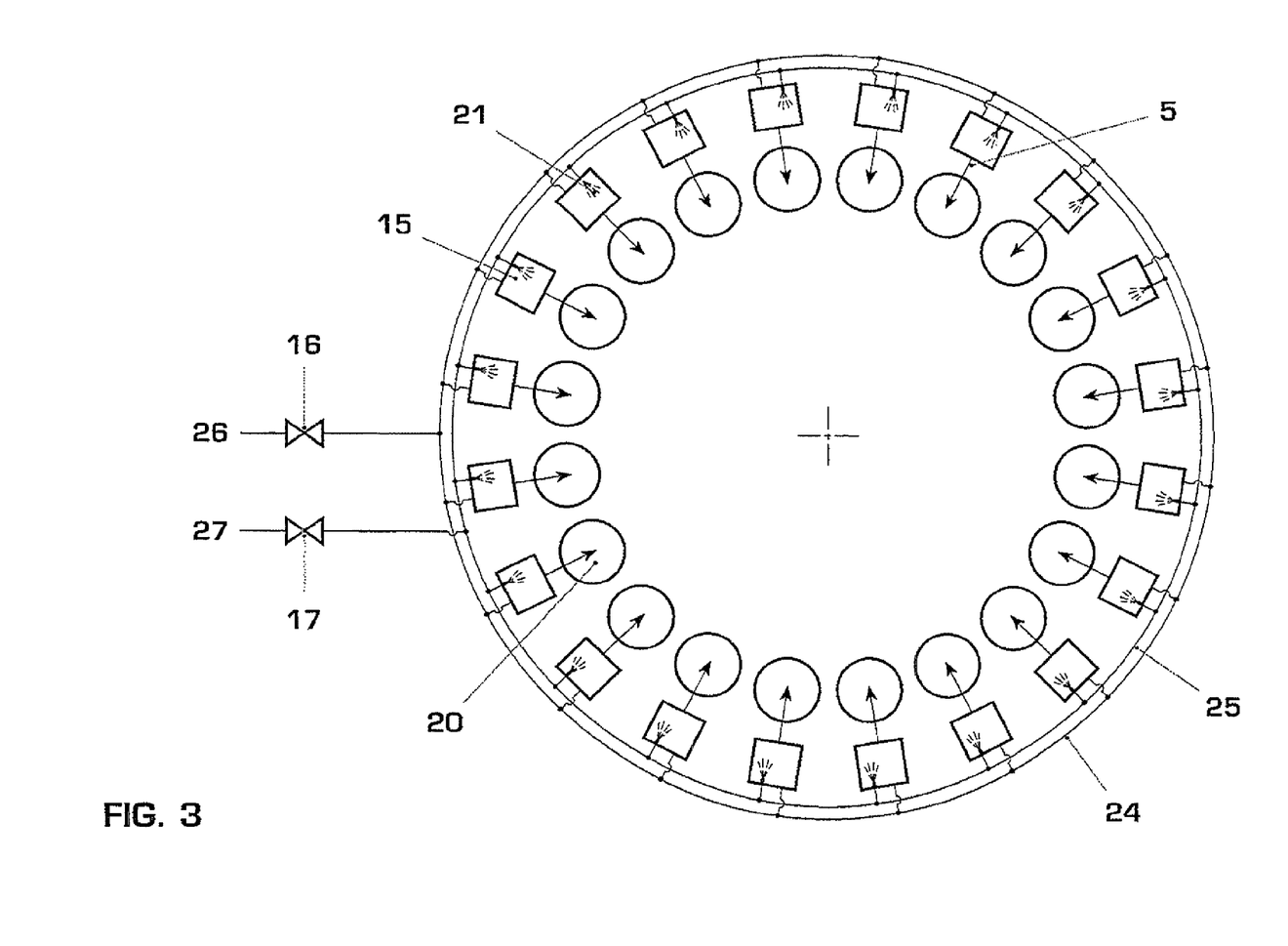
FIG. 3 shows details for a device for carrying out the method for water injection with individual plena for the injection of water into the fuel gas based on the example of a first combustion chamber.

The combustion chambers, for example, are constructed as annular combustion chambers with a multiplicity of individual burners 20, as is shown in FIGS. 3 and 4 based on the example of the first combustion chamber. Each of these burners is supplied with fuel gas via a fuel gas distribution system 24.

According to principles of the present invention, water is injected into the fuel gas before introduction into the burners 20 in order to create a water-fuel gas mist which prevents flashback and reduces NOx emissions. Exemplary embodiments of devices for water injection into the fuel gas and creation of the water-fuel gas mist are explained with reference to FIG. 3 and FIG. 4.

FIG. 3 shows an exemplary embodiment in which an individual plenum 15 is associated with each individual burner 20 of the first combustion chamber. The individual plena 15 are arranged directly upstream of the burners. As a result, the pipe length between the individual plena 15 and the burners 20 is minimized and a pipe routing which is as straight as possible is realized, avoiding deflections or bends on which drops can be deposited. Fuel gas is directed through each of these plena 15 and water is injected in a finely atomized state. For the water injection 21, for example a swirl nozzle or a multiplicity of swirl nozzles can be used for pressure atomization. The water-fuel gas mist is further injected via the water-fuel gas mist feed line 5 into the burners 20.

For supplying the individual plena 15 with fuel gas 26, an annular fuel gas distribution system 24 is provided. The fuel gas mass flow is controlled via a control component 16.

Furthermore, for supplying the individual plena 15 with water 27, an annular water distribution system 25 is provided. The water mass flow is controlled via a control component 17.

In further possible embodiments, the individual plena 15 are integrated into the burner head of the burners 20 or into a fuel lance which introduces the fuel into the combustion chamber.

FIG. 4 shows an exemplary embodiment in which the entire water-fuel gas mist which is required for a first combustion chamber, is created in one plenum 14. The fuel gas 26 is directed into this plenum 14 and water 27 is injected into this plenum in a finely atomized state. For the water injection 21, for example a swirl nozzle or a multiplicity of swirl nozzles can be used for pressure atomization. The water-fuel gas mist is further distributed via a fuel gas distribution system and injected into the burners 20 through the water-fuel gas mist feed line 5. The water drop size is to be selected small corresponding to the relatively long residence time of the drops in the fuel gas distribution system and to the deflections which are unavoidable in the case of this arrangement, and an oversaturation of the fuel gas is to be aimed at. The fuel gas mass flow is controlled via a control component 16. The water mass flow is controlled via a control component 17.

The development of the invention can be implemented for a second combustion chamber of a gas turbine plant with sequential combustion in a simple manner both with individual plena or with one plenum.

The water mass flow which is required for the reliable low-NOx-emission combustion of hydrogen-rich fuel gases is controlled in dependence upon a number of parameters, such as combustion chamber pressure, inlet temperature, etc.

In a practically simple embodiment, the ratio $\Omega$ of injected water and fuel gas is selected constant. The water portion $\Omega$ in this case is to be selected large enough for the water portion itself to still ensure a reliable operation under unfavorable operating conditions. The fuel gas mass flow in this case is controlled via the control component 16 corresponding to the gas turbine running concept and the commanded output. For the controller, therefore, the current fuel gas mass flow is known from the position of the control component or from a corresponding fuel gas measurement point. Multiplied by the predetermined water portion $\Omega$, the commanded water mass flow directly results. This is adjusted via the control component 17 and, if necessary, via corresponding water mass flow measurement.

In further refined embodiments, the water portion $\Omega$ is varied in dependence upon the relevant operating parameters. The dependencies can be represented by approximation equations for the control system or can be given to the control system for example in tables for interpolation.

In practically simple embodiments with swirl nozzles for pressure atomization, operation can be carried out with constant drop sizes. The injected amount of water is then varied in steps by the number of engaged injection nozzles. Via a variation of the water pressure, the water mass flow which is injected per nozzle can be further finely adjusted.

For injection into the fuel gas, as a rule highly-purified, demineralized water is used, as is also used for NOx reduction when operating on oil. The systems or similarly constructed systems which are available for this, such as water treatment and pumps, and also high-pressure pumps, can also be used for water supply and water injection into hydrogen-rich fuel gases.

LIST OF DESIGNATIONS

1 Compressor
2 Inducted air
3 Compressed air
4 First combustion chamber
5 Water-fuel gas mist feed line
6 Hot gases
7 First turbine
8 Partially expanded hot gases
9 Second combustion chamber
10 Water-fuel gas mist feed line
11 Hot gases
12 Second turbine
13 Exhaust gases (for the heat recovery boiler)
14 Plenum
15 Individual plena
16 Control component for fuel gas
17 Control component for injection water
18 Shaft
19 Generator
20 Burner for the first combustion chamber
21 Water injection
22 Cooling air
23 Cooling air
24 Fuel gas distribution system
25 Water distribution system
26 Fuel gas
27 Water
28 Burner for the second combustion chamber
$\Omega$ Water-fuel gas mass ratio
$\Phi$ Stoichiometric ratio of the fuel gas While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents.

The invention claimed is:

1. A method for operating a gas turbine with hydrogen fuel gas, the gas turbine including burners configured for mixing hydrogen fuel gas with combustion air, and having a combustion chamber downstream of the burners, the method comprising:
   injecting water into the hydrogen fuel gas upstream of the burners to create a water-fuel gas mist, wherein the injected water is atomized into water droplets suspended in the hydrogen fuel gas;
   doping the water, which is to be injected into the hydrogen fuel gas, with a flame-retarding agent, before the water is injected into the hydrogen fuel gas;
   introducing the water-fuel gas mist into the gas turbine burners;
   mixing the water-fuel gas mist with combustion air in the burners, wherein the water droplets remain suspended in the hydrogen fuel gas until the water-fuel gas mist reaches the burners, and including delaying a flame until the combustion chamber is reached by inhibiting temperature rise of the hydrogen fuel gas in the burner by heat of evaporation entrained water in the water-fuel gas mist; and
   burning a mixture formed by the mixing in the combustion chamber.

2. The method as claimed in claim 1, wherein creating the water-fuel gas mist comprises creating a water-fuel gas mist having a density higher than the density of the hydrogen fuel gas.

3. The method as claimed in claim 1, wherein injecting water comprises injecting water into the hydrogen fuel gas into a plena directly upstream of the burners.

4. The method as claimed in claim 1, wherein injecting water comprises injecting water into a single plenum, and further comprising:
   distributing the water-fuel gas mist to the burners by a fuel gas distribution system.

5. The method as claimed in claim 1, comprising:
   distributing the water-fuel gas mist before the water droplets of the water-fuel gas mist evaporate in injection plena or in feed pipes to the combustion chamber.

6. The method as claimed in claim 1, further comprising at least one of injecting steam, injecting nitrogen, and lowering operating parameters which are critical with regard to flashback.

7. The method as claimed in claim 1, wherein creating water-fuel gas mist further comprises controlling the droplet size of the injected water in dependence upon operating parameters selected from the group consisting of compressor exit temperature, combustion chamber pressure, fuel gas temperature, fuel gas mass flow, and combinations thereof.

8. The method as claimed in claim 1, wherein injecting comprises injecting an amount of water into the hydrogen fuel gas in proportion to an amount of fuel gas.

9. The method as claimed in claim 1, wherein creating water-fuel gas mist comprises maintaining constant a ratio $\Omega$ of injected water to hydrogen fuel gas.

10. The method as claimed in claim 1, wherein creating water-fuel gas mist comprises controlling a ratio $\Omega$ of injected water to hydrogen fuel gas in dependence upon operating parameters selected from the group consisting of compressor exit temperature, combustion chamber pressure, fuel gas temperature, fuel gas mass flow, material temperatures of components which are exposed to the risk of flashback, fuel gas composition, $H_2$ portion of the fuel gas, and combinations thereof.

11. The method as claimed in claim 1, wherein injecting water comprises cooling the hydrogen fuel gas before the hydrogen fuel gas reaches the combustion chamber.

12. The method as claimed in claim 1, wherein the injecting water comprises locally inhibiting a fast increase of the fuel temperature by evaporation of said droplets, said inhibiting reducing flame velocity.

\* \* \* \* \*